United States Patent

Dutto et al.

[11] Patent Number: 5,812,392
[45] Date of Patent: Sep. 22, 1998

[54] PROGRAMMABLE SEQUENCER FOR ELECTRIC VALVES USED IN A HOLLOW GLASS MANUFACTURING INSTALLATION

[75] Inventors: Ivo Dutto; Alfonso Arechaga, both of Llodio, Spain

[73] Assignees: Vidrala, S.A.; Avacon, S.A., both of Spain

[21] Appl. No.: 531,128

[22] Filed: Sep. 20, 1995

Related U.S. Application Data

[63] Continuation-in-part of Ser. No. 206,454, Mar. 4, 1994, abandoned.

[30] Foreign Application Priority Data

Jun. 18, 1993 [ES] Spain ................................. 9301359

[51] Int. Cl.[6] .................... G05B 11/01; G06F 19/00
[52] U.S. Cl. ..................... 364/140.05; 364/140.02; 364/473.01
[58] Field of Search ........................... 364/140, 141, 364/475.02, 475.05, 475.06, 475.09, 140.02, 140.05, 473.01, 473.02

[56] References Cited

U.S. PATENT DOCUMENTS

| | | | |
|---|---|---|---|
| 4,547,211 | 10/1985 | Ananias | 364/476.01 |
| 4,641,269 | 2/1987 | Japenga | 364/476.01 |
| 4,689,736 | 8/1987 | Glaudel et al. | 364/140 |
| 4,855,729 | 8/1989 | Takeuchi et al. | 340/825.05 |
| 5,247,450 | 9/1993 | Clark | 364/474.11 |
| 5,580,366 | 12/1996 | Farkas et al. | 364/477.01 |

*Primary Examiner*—Paul P. Gordon
*Attorney, Agent, or Firm*—Bierman, Muserlian and Lucas

[57] ABSTRACT

Improved programmable sequencer for electric valves used in a hollow glass manufacturing installation, consisting of a processor and a power source connected respectively by optic fiber and conventional cables with a distributor provided in the vicinity of the installation, which consists of a converter of optic fiber signals to electrical signals, in communication with an electronic block provided in the installation which consists of a series/parallel, parallel/series converter that communicates with an electronic power block abutting against the electric valve block that it is desired to sequence.

3 Claims, 5 Drawing Sheets

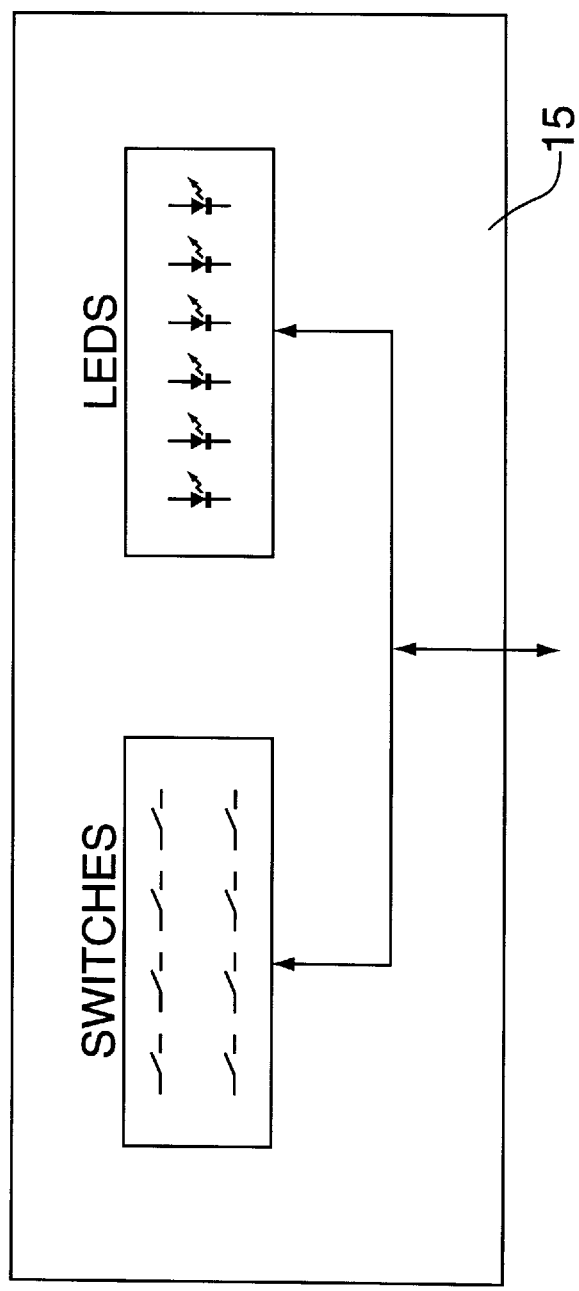

PROGRAMMABLE SEQUENCER FOR ELECTRIC VALVES USED IN A HOLLOW GLASS MANUFACTURING INSTALLATION

This is a continuation-in-part of U.S. patent application Ser. No. 08/206,454 filed Mar. 4, 1994 now abandoned.

BACKGROUND OF THE INVENTION

Installations for the manufacture of hollow glass use numerous devices, such as fluid drive cylinders, which are driven by electric valves.

Electric valves need to receive driving energy (power) and be computer-controlled.

For this there are provided between the feed-control centers and the installation proper heavy cables, tens of meters in length, which in turn require placement, conduits and costly maintenance services.

At the same time it has to be kept in mind that a high degree of reliability of the data managed is essential and that the medium is very aggressive because of the high temperature, liquids, greases, etc. which easily cause wear and tear on the electronic-computer or intelligent means.

SUMMARY OF THE INVENTION

The applicant has developed a sequencer for said electric valves which overcomes the obstacles and disadvantages mentioned above. Specifically, the sequencer comprises:

a) a processor and a power source connected respectively by optic fiber and conventional cables with b) a distributor means provided in the vicinity of the installation, which consists of a converter of optic fiber signals to electrical signals, in communication with c) an electronic block provided in the installation which consists of a series/parallel, parallel/series converter that communicates with an electronic power block abutting against the electric valve block that it is desired to sequence.

An Improved programmable sequencer for electric valves used in a hollow glass manufacturing installation, according to the present invention, comprising:

a) a processor and a power source;

b) a distributor means provided in the vicinity of the installation, which consists of a converter of fiber optic signals to electrical signals, said distributor means being connected by optic fiber to said processor and said distributor means being connected by conventional cables to said power supply; and c) an electronic block provided in the installation which consists of a series/parallel, parallel/series converter that communicates with an electronic power block abutting against the electric valve block that it is desired to sequence, said electronic block in communication with said distributor means.

Preferably, the improved programmable sequencer for electric valves used in a hollow glass manufacturing installation, according to the present invention, provides serial communication between the distributor means and the converter.

Also, preferably, the improved programmable sequencer for electric valves used in a hollow glass manufacturing installation, according to the present invention, has a terminator control panel which communicates with a preliminary control panel whose inputs/outputs to the converter are serial, an input multiplexer and an output multiplexer are also provided for communication with it.

It is also preferred that the improved programmable sequencer for the electric valves used in a hollow glass manufacturing installation, according to the present invention, provides that the parallel output of the converter is sent by means of output multiplexer to a optoconnection block of the electronic power block.

BRIEF DESCRIPTION OF THE DRAWINGS

FIG. 5 is a block diagram of the terminator control panel.

DETAILED DESCRIPTION OF THE PREFERRED EMBODIMENTS

The sequencer is used in an installation for the manufacture of hollow glass, for example, bottles, wherein the medium is very aggressive, with pollution, greases and high temperatures, for which reason the high-tech electronic components, and especially the intelligent ones, are at great risk of damage.

Figure 1:
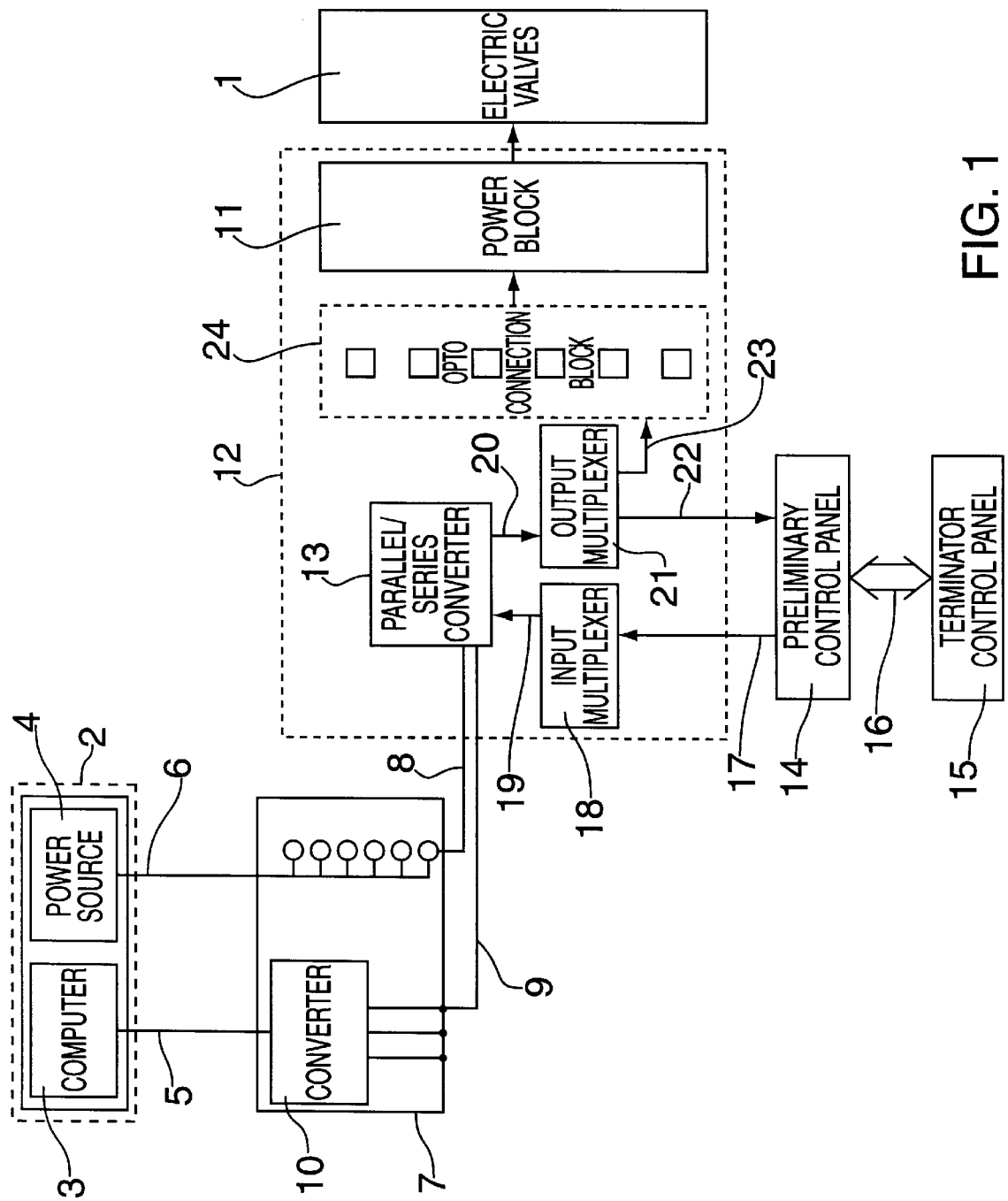
FIG. 1 is a block diagram of the improved sequencer of the invention.

Electric valves (1) control the various devices of the installation and, consequently, the command-control cabinet (2) is located at some distance from the installation proper or, what is the same thing, as in FIG. 1, from the complex of electric valves (1). The distance may be tens of meters.

In the cabinet or enclosure (2) there is provided a computer (3) which is programmable and has the intelligent elements, and a power source (4).

Communication-orders by the computer (3) are effected by optic fiber (5) and electrical energy or power from the source (4) is effected by a conventional cable (6).

The distributor means is a distribution box (7), located in the vicinity of the installation, in which the distribution of power cabling (6 and 8) and communications cabling (5 and 9) is effected by means of an optical to electrical converter (10) of optic fiber signals (5) to RS485 electrical signals over communication cable (9).

It is not advisable to use optic fiber in the rest of the sequencer, since optic fiber is very delicate and deteriorates easily with handling.

It must be kept in mind that the power block (11) typically requires frequent handling and repairs, and therefore use of optic fiber in power block (11) is inadvisable.

The power block (11) (conventional in itself) is placed abutting against the block of electric valves (1) that it feeds, so that cabling is eliminated.

The power block (11) is integrated in an electronic block (12), without intelligent elements, which consists of a series/parallel and parallel/series converter (13) that communicates serially with the distribution box (7).

A preliminary control panel (14) for the start of manufacturing operations and a terminator control panel (15) for ending them are provided in the installation.

A communication bus (16) is provided between the two panels (14), (15).

The series output (17) of the preliminary control panel (14) is sent to an input multiplexer (18), whose output (19) goes in parallel to the converter (13).

The parallel output (20) of the converter (13) is sent to an output multiplexer (21) which sends a series output (22) to the preliminary control panel (14) and another series signal (23) to an optoconnection block (24) for the power block (11).

Computer (3) is a conventional piece of equipment. It is programmable and the user of the present invention will program the computer to control the electronic valves in a substantially similar manner to that of a computer used in the prior art for driving the electronic valves. A suitable computer for use in the present invention is Motorola's MVME177 Single Board Computer.

Power source (4) is a conventional piece of equipment. Suitable power sources include ASTEC's Power Module AL60A DC-DC converter.

Optical to electrical converter (10) is a conventional piece of equipment. Suitable converters (10) include Hewlett Packard HFBR 24X2 fiber optic receiver and Hewlett Packard HFBR-14XX fiber optic transmitter.

The serial to parallel and parallel to serial converters (13) are conventional pieces of equipment.

A serial to parallel converter transforms a temporal sequence of input signal modulation to a group of N output signals modulation. The modulation of N output signals is simultaneous.

Input signal modulation can be done over one or more physical magnitudes. This modulation sequence carries in each change at least one information unit (bit). The group of N output signals carries in each of its modulation changes at least N bits.

For this reason, a serial to parallel converter transforms a throughput of at least 1 bit per input signal modulation, to a throughput of N bits per output signal group modulation; this last throughput is done in packed form.

The serial to parallel converter is able to convert an input signal (serial signal) into a 16 signal group (parallel signals). In the present invention, the serial to parallel converter outputs more than 16 signals, for that reason the available 16 signals are codified to $2^7$ words of 8 bits: 7 bits are for address coding and 8 of the rest of signals are for the value of the 8 bit word.

With this coding system it is possible to select $2^7$ devices of 8 bits. The refresh rate for each 8 bit word is $2^7$ times slower than the rate for the original 16 bit word.

Parallel to serial converters work in an opposite manner to the serial to parallel converter both of which are represented in FIG. 1 at box 13. The parallel to serial converter is able to convert a 16 signal group (parallel signals) to 1 signal (serial signal). Since more than 16 signals are needed to be converted, the 16 signals are codified to $2^7$ words of 8 bits: 7 bits are for address coding and 8 of the rest of the signals are for the value of the 8 bit word.

With this coding system it is possible to select $2^7$ devices of 8 bits. The refresh rate for each 8 bit word is $2^7$ times slower than the rate for the original 16 bit word.

Figure 2:
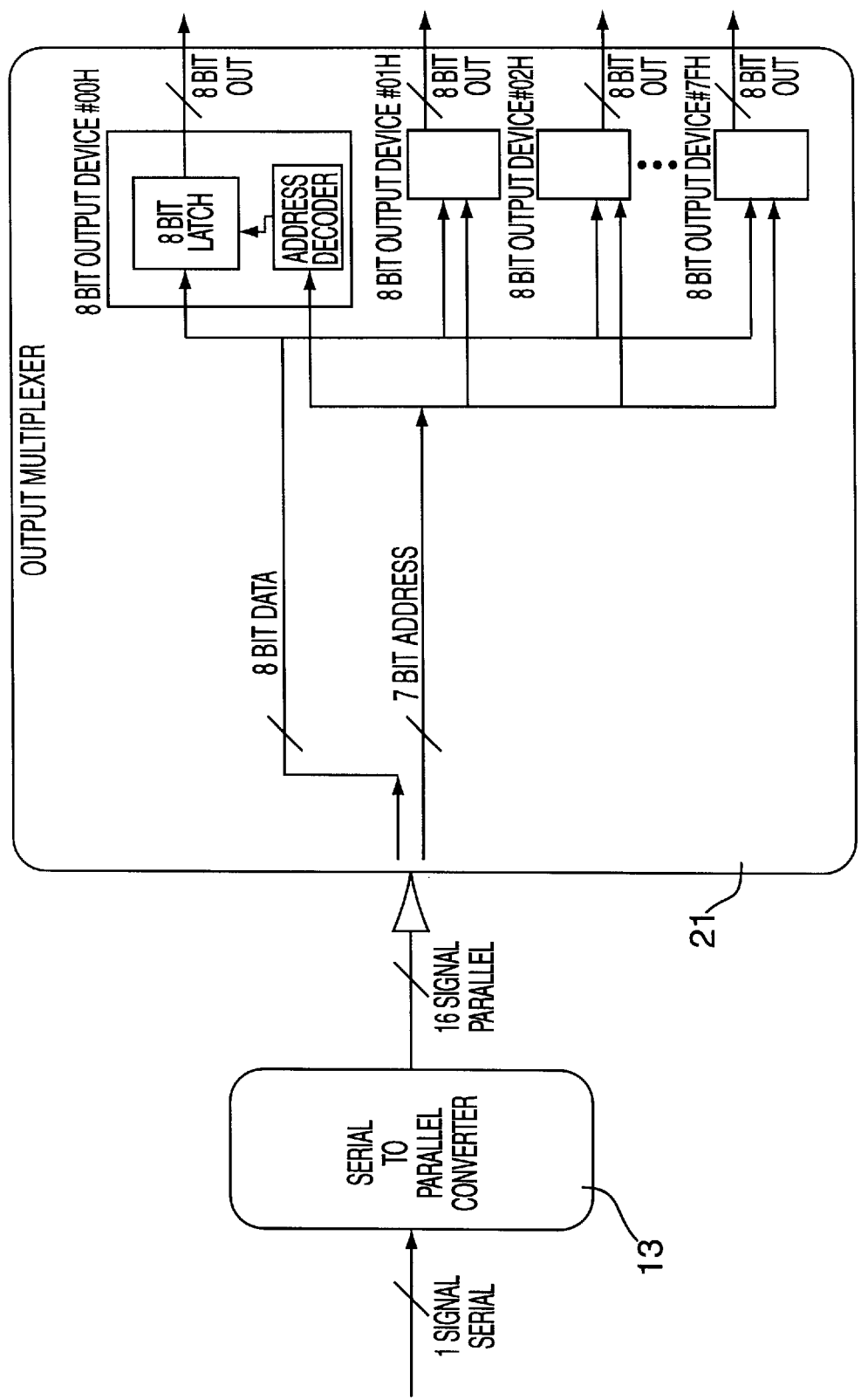
FIG. 2 is a block diagram of the serial to parallel converter and output multiplexer.

FIG. 2 is a block diagram of the output multiplexer (21) and the serial to parallel converter (13). The output multiplexer (21) is constructed with a CMOS standard LSI device and PAL (Programmable Array Logic) devices.

Figure 3:
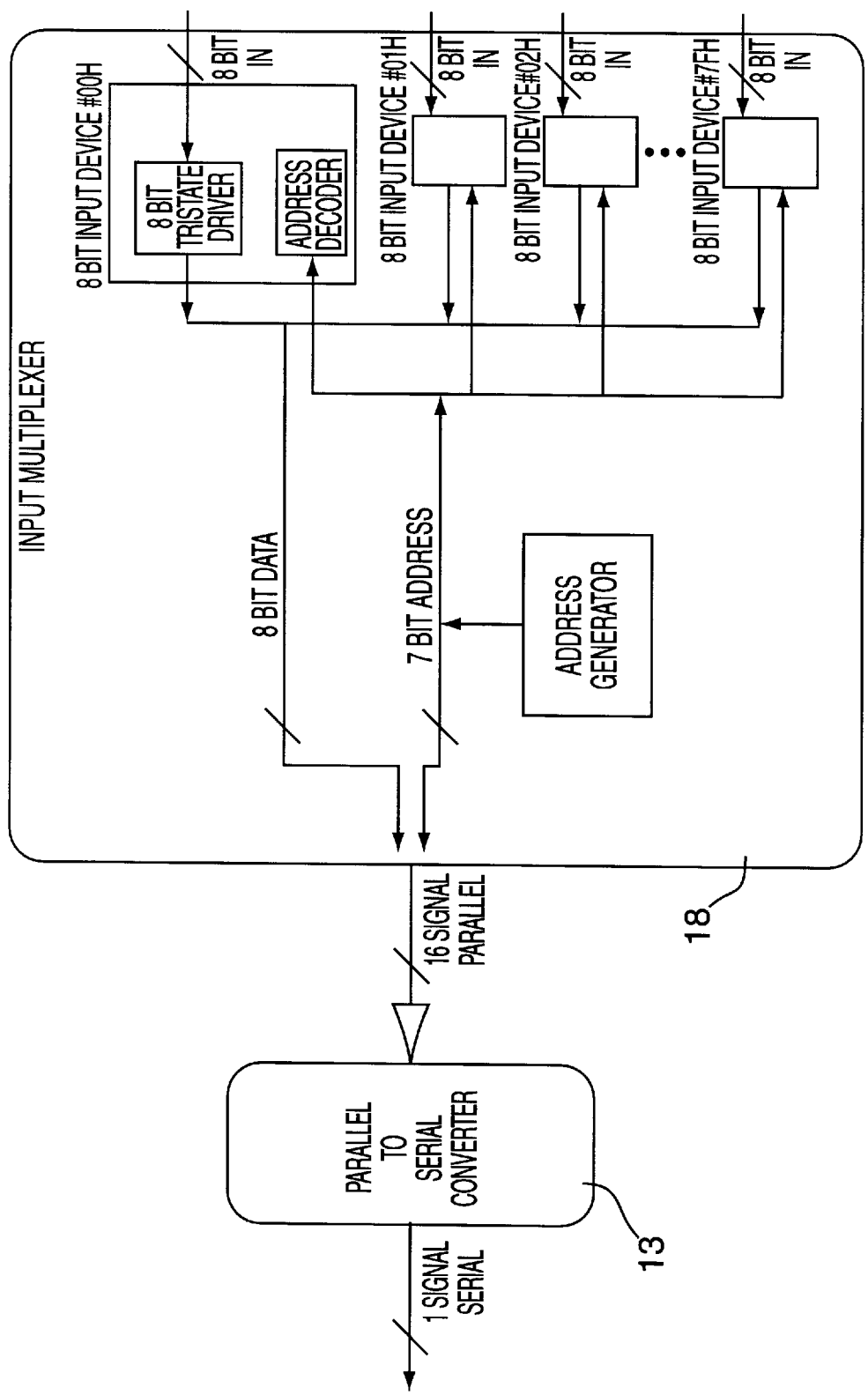
FIG. 3 is a block diagram of the parallel to serial converter and the input multiplexer.

FIG. 3 is a block diagram of the input multiplexer (18) and parallel to serial converter (13). The input multiplexer (18) is constructed with CMOS standard LSI devices and PAL devices.

Figure 4:
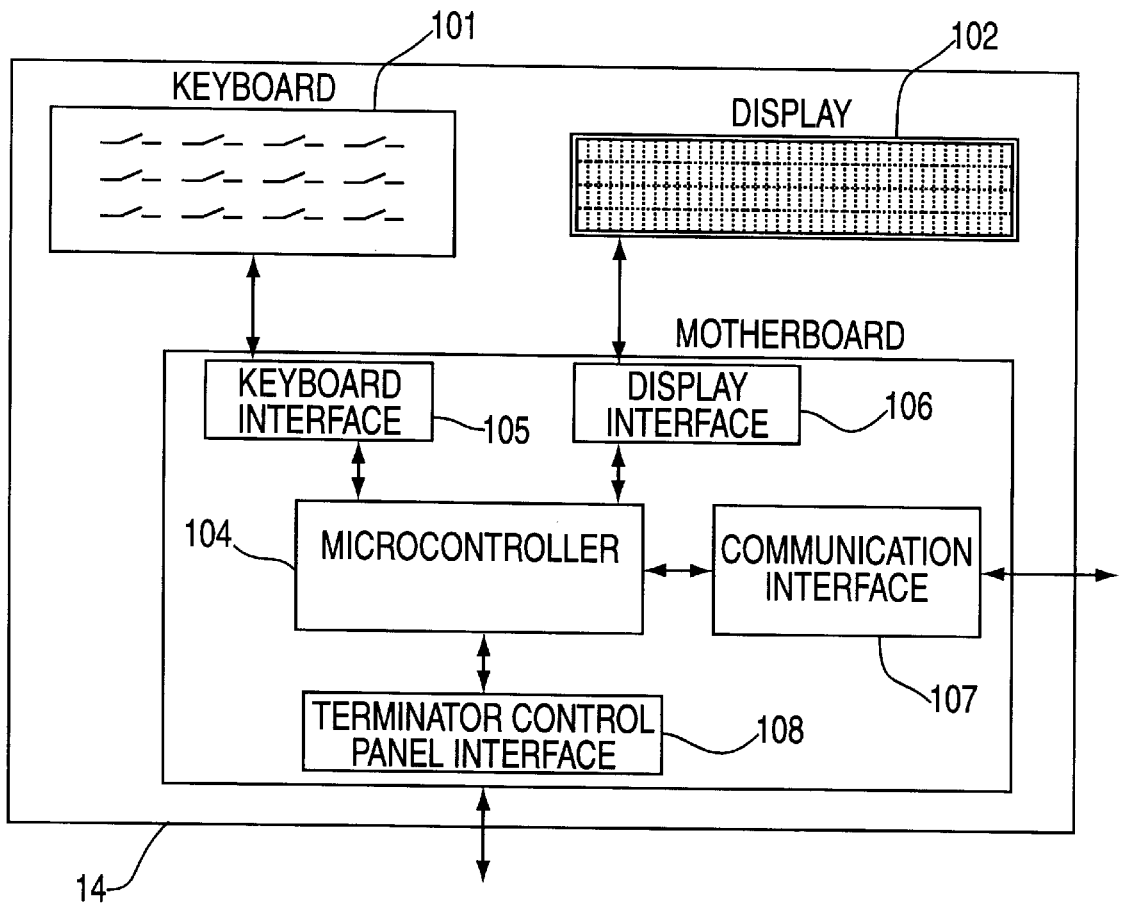
FIG. 4 is a block diagram of the preliminary control panel.

The preliminary control panel (14) allows operator interface with the sequencer in each machine section. As shown in the block diagram of FIG. 4, the main components for the control panel (14) are Keyboard (101), Display (102), and Microcontroller based motherboard (103). The motherboard has several parts including: Microcontroller (104); Keyboard Interface (105); Display Interface (106); Communication Interface (107); and Terminator Control Panel Interface (108).

In the glass industry the preliminary control panel (14) is referred to as the Blank Side Operator Panel. Preliminary control panel (14) is constructed with CMOS standard LSI devices, PAL devices and a standard programmable microcomputer. The microcomputer is programmed in a state-of-the-art form to accept operator keystrokes, to display messages and to illuminate LEDs. The number and type of keys, displays and LEDs are not important for the present invention.

The terminator control panel (15) is a slave of preliminary control panel (14) and is referred to in the glass industry as the Blow Side Operator Panel. The terminator control panel (15) is constructed with electromechanical switches and LEDs. The number and type of switches and LEDs are not important for the present invention. FIG. 5 is a block diagram of the terminator control panel (15).

The function of the optoconnection block (24) is to effect electrical isolation between the logical power supply and power supply (4). Optoconnection block (24) is a conventional arrangement of optocouplers. Suitable optocouplers include the Hewlett Packard High CMR (Common Mode Rejection) High Speed TTL compatible optocoupler 6N137/HCPL-2601/11.

The function of the power block (11) is to switch (on and off) the field electrical voltages over electrovalves. This switch is controlled by the output of optocouplers of the optoconnection block (24). It is suitably constructed with transistors, darlingtons and other electrically controlled power switch devices in a conventional manner. Power block (11) is a conventional piece of equipment. A suitable power block includes N-Channel enhancement mode power MOS transistors such as the type BUZ80 and BUZ80FI made by SGS-Thomson Microelectronics.

It will be understood that the preferred embodiments of the present invention herein chosen for the purpose of illustration are intended to cover all changes and modifications of the preferred embodiments of the invention which do not constitute a departure from the spirit and scope of the invention.

What is claimed is:

1. An improved programmable sequencer for sequentially driving electric valves in a hollow glass manufacturing installation comprising:

a processor for providing control signals for sequentially driving electric valves through fiber optic cables;

a power supply for providing power through power cables;

a distributor means for receiving and converting fiber optic signals from said processor into electrical signals and for receiving said power from said power supply through one of said power cables, said distributor means being connected by fiber optic cables to said processor to receive said control signals therethrough and including means to convert said control signals and transmit said control signals as electrical signals in serial form, said distributor means being located in the vicinity of hollow glass manufacturing installations; and an electronic block adapted to receive said electrical control signals from said distributor means and to transmit said received control signal to said electric valves of said hollow glass manufacturing installation to drive said electric valves sequentially, said electronic block receiving power from said distributor means by another one of said power cables, said electronic block including a series to parallel circuit and a parallel to series circuit to convert said received control signals from said distributor means from serial form to parallel form and to transmit said signals in parallel form to said electric valves.

2. The improved programmable sequencer for electric valves used in a hollow glass manufacturing installation according to claim 1 further comprising a terminator control panel which communicates with a preliminary control panel; and wherein said electronic block comprises an input multiplexer and an output multiplexer for communication with it, said output multiplexer receiving said command signals in parallel form from said series to parallel circuit in said electronic block and to convert said command signals to serial form and to transmit said command signals in serial form to said preliminary control panel and to said electric valves; and said input multiplexer receiving signals in serial form from said preliminary control panel and converting said signals to parallel form and to transmit said signals in parallel form to said parallel to series circuit of said electronic block.

3. The improved programmable sequencer for electric valves used in a hollow glass manufacturing installation according to claim 2, wherein said electronic block comprises an optoconnection block and a power block, said power block controlling said electronic valves of said hollow glass manufacturing installation, said optoconnection block to receive control signals in serial form from said output multiplexer and to control said power block.

* * * * *